United States Patent [19]
Greig

[11] Patent Number: 4,714,276

[45] Date of Patent: Dec. 22, 1987

[54] MULTIPLE-PART FORM WITH ONE OR MORE PARTS REMOVABLY RETAINED BY TEMPORARY ADHESION IN STUB AREA

[75] Inventor: Walter G. Greig, Lewiston, N.Y.

[73] Assignee: Moore Business Forms, Inc., Glenview, Ill.

[21] Appl. No.: 911,411

[22] Filed: Sep. 25, 1986

[51] Int. Cl.$^{4}$ .......................... B32B 7/06; B32B 7/10; B32B 7/12

[52] U.S. Cl. .............................. 283/63 R; 283/66 A; 281/15 R; 281/16; 30428/42; 30428/40; 30428/43; 30428/194; 30428/212

[58] Field of Search ..................... 428/194, 43, 40, 42, 428/212; 281/15 R, 16; 283/63 R, 63 A, 66 A

[56] References Cited

FOREIGN PATENT DOCUMENTS 452479 5/1968 Switzerland .

*Primary Examiner*—Alexander S. Thomas

*Attorney, Agent, or Firm*—Cushman, Darby & Cushman

[57] ABSTRACT

A pad is provided of a stack of preprinted sheets grouped set by set in at least one set, at least some sheets of which differ in some way from the others by virtue of the information, indicia, routing indicator, pattern of carbonless back-coating, color or the like. Within the pad, each sheet is serially connected to its neighbors along at least one respective margin of each, at least one of these connections in each set being by means of a strip of non-drying, lightly tacky pressure-sensitive adhesive, e.g. so as to provide a multiple part business form set or a pad of several multiple part business form part sets stacked in series, in which at least some of the sheets are connected to adjacent sheets at least generally in accordance with the way that is disclosed in Swiss Pat. No. 452,479.

5 Claims, 2 Drawing Figures

MULTIPLE-PART FORM WITH ONE OR MORE PARTS REMOVABLY RETAINED BY TEMPORARY ADHESION IN STUB AREA

BACKGROUND OF THE INVENTION

In recent years pads of paper have become very popular in which each sheet has a marginal stub area bearing on its underside a band of non-drying, slightly-tacky adhesive which, while permanently bonded to the underside of the sheet, only temporarily bonds to other surfaces, including to the stub areas of the top surfaces of respectively adjacent like sheets in the stack which constitutes the pad.

The general concept of such a product is disclosed in the Swiss patent of Eugster 452,479, dated May 31, 1986.

Eugster discloses a paper pad that is composed of self-adhesive individual sheets and is characterised in that each sheet is detachably joined to the sheet underneath it by means of a non-drying adhesive and in that the strip of adhesive provided at the edge of each individual sheet has one side which is smooth and adherent but does not take up adhesive while the other side carries the adhesive. The side carrying the adhesive may be arranged on the underside of the sheet. The adhesive applied to this side cannot be removed without chemical agents. When two such surfaces of adhesive strip which have been glued together are separated, virtually all the adhesive is left on the underside while the upper surface remains unwetted.

When assembling such a pad with the aid of non-drying adhesive, the top edge of each individual sheet is mechanically pressed with its underside, which receives adhesives, to the smooth upper surface of the other sheet, which does not take up adhesive. The individual sheets are thereby bonded together but they are not permanently fixed together, that is to say they are not glued together but can be separated one by one by hand. When a sheet is removed, the adhesive is left on the underside of the sheet so that the sheet which has been removed can be fixed by light finger pressure to another surface without the use of fresh adhesive.

Adhesives and paper useful in making such products are well known in the particular art.

When such pads first became widely available to the public in the United States about 10 years ago, the individual sheets bore no preprinting whatsoever, and the major uses were for temporarily tabbing pages of interest on documents, sometimes with notations field-applied, e.g. for indicating where a typographical correction to the adjacent text was needed, and for leaving notes in conspicuous places, e.g. on or about a person's desk, by their telephone, on a book or correspondance, on their refrigerator door and so forth. After a matter of time, a few months or perhaps a couple of years or so, pads of such sheets, containing identical designs, preprinted information or a format or gridwork for information on each sheet made their appearance. One example is a preprinted gridwork for leaving a message that one person would like to contact, or is attempting to contact another person by telephone or in some other way. Another is a pad of preprinted routing slips for books, correspondance or documents. Pads of humorous one-sheet greeting cards preprinted and assembled in a like matter even more recently have become available. However, in each instance of which the present inventor is aware, all sheets in any one stack have been preprinted with the identical information and/or decoration.

The present inventor is an employee of a company which not only makes and sells, under the trademark Note-Stix, several varieties of note pads of the type which has just been described, but also has a regular business of making and selling a wide variety of business forms, including ones which are available in pad form, and ones which are furnished in sets, each set being made up of a stack of several sheets or "parts" which are serially attached to one another along at least one edge or margin of each sheet. Frequently, each part in a set is different from the others in some readily apparent way, e.g. it is in a different color and bears an indication that it is to be retained by or routed to a particular party, office or functional unit. It is not uncommmon for sheets in such sets to be interleaved with or to bear as coatings on their undersides pressure-activated copy-making material such as carbon paper or carbonless coatings of micro-encapsulated ink. In some cases the set has a definite marginal strip or stub composed in part of a portion of each of the form parts, from which the remainder of at least one of the sheets can be detached, e.g. along a line of weakness such as a line of pre-formed perforation, leaving behind the stub or marginal strip, and often one or more of the form parts.

However, to the present inventor's knowledge there has been heretofore little or no effective cross-fertilization of these two fields of technology, i.e. pads of temporarily adhered notes, and sets of multiple-part forms. The present invention involves an advantageous hybridization of these two fields of technology.

SUMMARY OF THE INVENTION

A pad is provided of a stack of preprinted sheets grouped set by set in at least one set, at least some sheets of which differ in some way from the others by virtue of the information, indicia, routing indicator, pattern of carbonless back-coating, color or the like. Within the pad, each sheet is serially connected to its neighbors along at least one respective margin of each, at least one of these connections in each set being by means of a strip of non-drying, lightly tacky pressure-sensitive adhesive, e.g. so as to provide a multiple part business form set or a pad of several multiple part business form part sets stacked in series, in which at least some of the sheets are connected to adjacent sheets at least generally in accordance with the way that is disclosed in Swiss patent 452,479.

The principles of the invention will be further discussed with reference to the drawing wherein a preferred embodiment is shown. The specifics illustrated in the drawing are intended to exemplify, rather than limit, aspects of the invention as defined in the claims.

DETAILED DESCRIPTION

Figure 1:
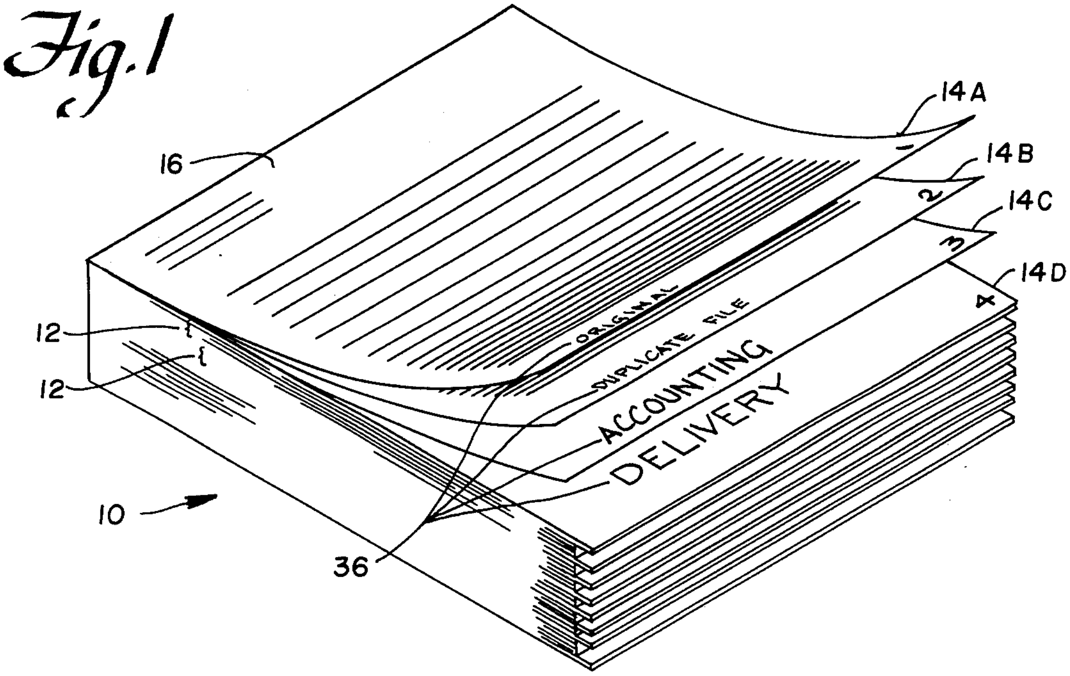
FIG. 1 is a partly exploded perspective view of a multiple part form embodying principles of the present invention.
Figure 2:
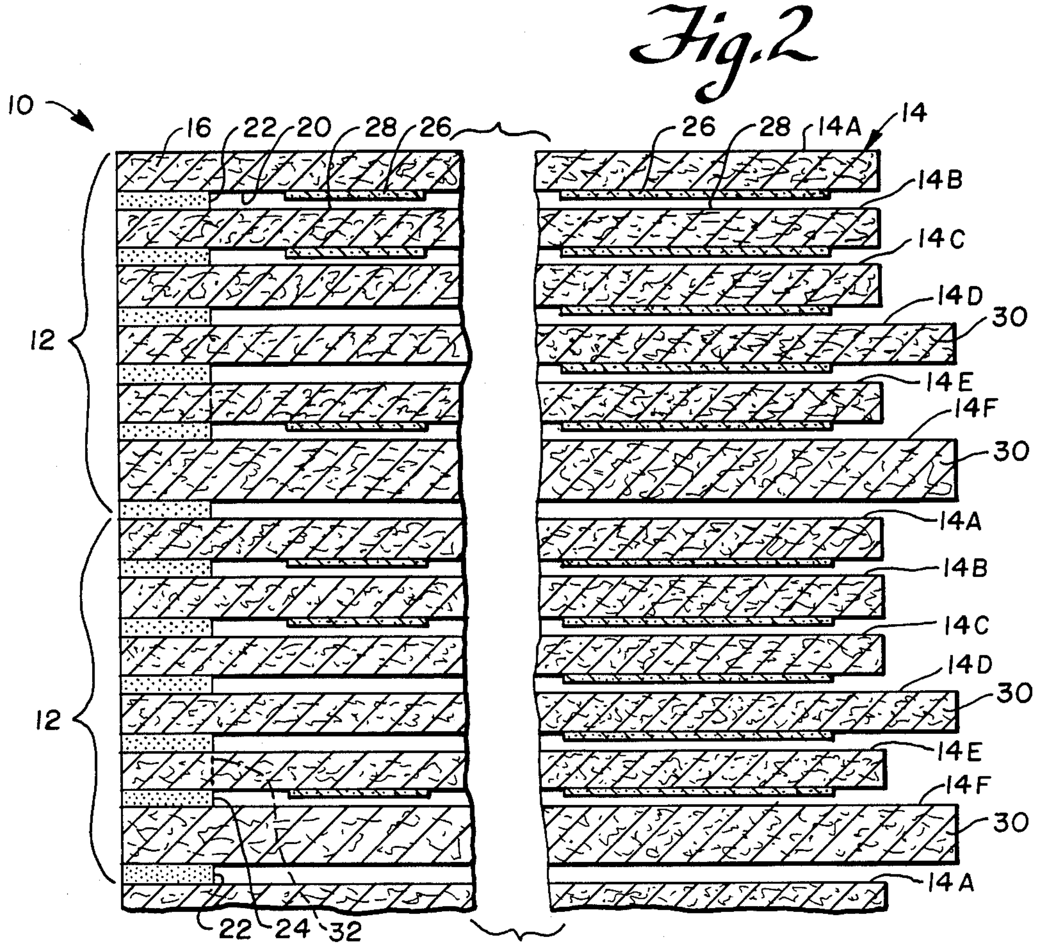
FIG. 2 is a fragmentary, enlarged scale side elevational view of a pad of such forms, with thickness exaggerations made in order to facilitate the illustration of certain details.

A pad 10 made up of a stacked series of multiple part sets 12 of preprinted business forms. In the example shown, each set consists of six parts (i.e. six sheets with or without adjuncts) although each set could consist of from two to several parts. For convenience in reference, the sheets in a set 12 have been given a general numeral 14, to which a suffix A-F will be appended when referring to a distinct sheet.

In the instance depicted, each of the sheets 14 has one margin 16, extending between two opposed edges 18 which is designated a stub region and in this region, each of the sheets 14 carries on its undersurface 20 a band of adhesive 22, 24. One or more of the sheets 14, in or outside the stub area thereof may also carry on its undersurface 20 a regional coating 26 of carbon-type or carbonless pressure-sensitive copy-making coating adapted to produce on the respective underlying region 28 of the upper surface of the respective next sheet 14 a replica of what is pressed on the sheet from above. Rather than being a coating, the copy-making means 26 may be constituted by an interleaved sheet of carbon paper, carbonless carbon paper or the like.

In the instance depicted, in each set, the sheets 14A–14F are equal in width and the sheets 14A, 14B, 14C and 14E are equal in length, but the sheets 14D and 14F have marginal tabs 30 which extend beyond the respective edges of the other sheets.

Also in the instance depicted, the sheets 14A–14E are all equal to one another in thickness, but sheet 14F, the lowermost sheet in the set, is somewhat thicker.

On the sheets 14A–14D and 14F the margins 16 are not set off from the main body of the respective sheets by any line of weakness, in the illustrated example, but the sheet 14E has a line of weakness 32 (e.g. a line of perforations) extending thereacross between the margin 16 thereof and the body 34 thereof.

In the example shown, the bands of adhesive 22 are bands of non-drying, lightly tacky adhesive such as is disclosed in Swiss patent 452,479. In the embodiment depicted, the bands 22 are applied to the undersides of the sheets 14A–14D and 14F respectively for releasably, reversibly adhering the marginal regions 16 of sheets 14A–D of one set to the marginal regions 16 of the sheets 14B–14E in one set and the marginal region 16 of sheet 14F in one set to the marginal region 16 of the sheet 14A of the adjacent next-lower set. Of course, a pad could be only one set of sheets 14A–F with no adhesive on the back of 14F.

The band 24 is made of conventional permanent adhesive in this example. In practice, all or only some of the bands may be of releasable/reusable adhesive 22, and none or some of the bands may be of permanent adhesive 24. Use of adhesive 22 permits a sheet or a set or sub-set of sheets above an adhesive/next lower sheet interface to be easily peeled free of the remainder. Use of adhesive 24 ensures that at least the stub 16 of the respective sheet will remain secured to the stub region of the next lower sheet, although a line of weakness 32 associated with a permanently adhered sheet (14E) allows that sheet to be snapped out of the stack, leaving its stub in place, without disrupting the securement of other sheets to one another in the respective margin of the set.

It should now be noticed that the sheets 14A–14E in each set, on their respective upper surfaces bear indicia 36 which in informational content, color, routing indicator and/or the like differs from sheet to sheet. Although two or more sheets may be duplicates in each set, in each set there are at least two different indicia patterns and, by preference, no two sheets 14 in a set have like patterns but, among the sets, corresponding sheets are alike except perhaps for a unique set number or the like.

The form parts containing the adhesive 22 can be easily separated from the others, with the reusable adhesive 22 remaining on the underside now providing a convenient means for removably attaching that form part or set or sub-set of form parts to an article, display surface, message board or the like.

Accordingly, the preprinted indicia may be such as to suit the sets for use as work orders, routing slips, correspondance pads, article-related information-bearers, notice posters and the like.

Although the pad 10 has been shown being one set wide and one set long but several sets thick, it could also or in the alternative be several sets wide or long, with lines of weakness provided for severing sets one by one from the pad. And other features commonly found in business forms such as glue strips for fastening folded sheets to themselves to form mailers, and rows of sprocket holes for accomodating the sets for use on rotary pin-fed business-form processing equipment may be provided, as will be understood by those skilled in the art.

It should now be apparent that the multiple-part form with one or more parts removably retained by temporary adhesion in stub area as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A preprinted form pad, comprising:

a stack of two-sided sheets preprinted on one side with at least one of verbal and non-verbal indicia, said sheets being grouped serially by set in at least one set, each set being comprised of a plurality of said sheets;

said preprinted indicia on at least two of said sheets in each set differing from sheet to sheet;

each said sheet being serially connected to neighboring said sheets in said stock along at least one respective margin of each, at least one of such connections in each set being by means of a strip of non-drying, lightly tacky pressure-sensitive adhesive which is adapted to permit each respective sheet bearing such adhesive to be easily peeled free of the respective underlying said sheet and temporarily adhered by such adhesive to another surface, and at least another of such connections in each set being by means of a strip of permanent adhesive.

2. The preprinted form pad of claim 1, wherein:

each sheet in each set contains preprinted indicia distinguishing that sheet from all others in the same said set.

3. The preprinted form pad of claim 1, wherein:

said at least one sheet connected by means of a strip of permanent adhesive is provided with a line of weakness extending thereacross bordering said margin thereof for facilitating severing of that sheet from its own said margin.

4. The preprinted form pad of claim 1, wherein:

in each set at least one sheet is back-coated in at least one region thereof with pressure-activated means for transferring pressure-applied copy to a respective underlying said sheet.

5. The preprinted form pad of claim 1, wherein:

in each set at least one said sheet has a protruding tab portion which projects beyond a respective edge of at least one other said sheet in the respective said set.

* * * * *